Figure 1:
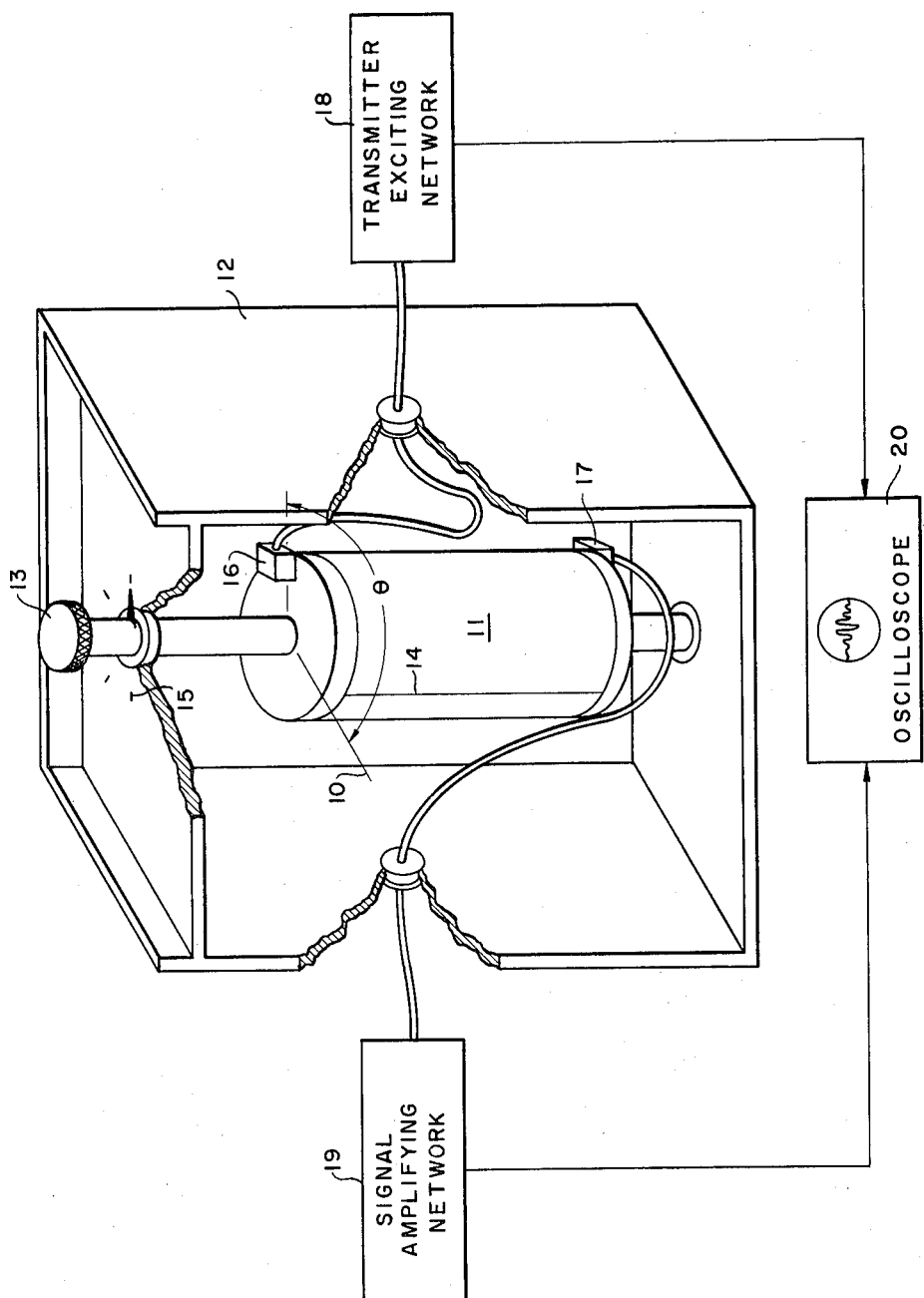

INVENTORS:
GILBERT E. LEONARDON
CHARLES B. VOGEL
BY: Theodore E. Bieber
THEIR ATTORNEY INVENTORS:
GILBERT E. LEONARDON
CHARLES B. VOGEL
BY: *Theodore E. Bieber*
THEIR ATTORNEY United States Patent Office 3,251,221
Patented May 17, 1966

3,251,221
GRADIENT DIRECTION LOGGING
Charles B. Vogel and Gilbert E. Leonardon, Houston, Tex., assignors to Shell Oil Company, New York, N.Y., a corporation of Delaware
Filed Dec. 31, 1964, Ser. No. 425,378
3 Claims. (Cl. 73—69)

This invention relates to geophysical exploration, and pertains more particularly to a method of locating earth formations associated with petroleum deposits by obtaining from earth formations an indication of the geographic direction along which the formation was the most extensive at the time of deposition or the direction along which a preferred permeability exists. This application is a continuation-in-part of application Serial Number 64,383, filed October 24, 1960, now abandoned.

A granular earth formation of primary origin is an aggregation of particles, fragments of minerals, or fragments of older rocks that have been washed away from areas which have been eroded. In formations of primary origin, the geological character is directly related to the character of the particles deposited and the conditions under which they were deposited, as distinguished from an originally integral rock formation which has been fractured or ground into fragments. The granular earth formations of primary origin are often called fragmental, clastic, or detrital rocks, and they vary widely in character depending on the nature of the eroded material, the distance it was transported, the transporting agency, and the like.

Such granular earth formations, particularly those containing grains in the size range including the sands, the smaller pebbles and the coarser silts, are quite frequently associated with petroleum deposits. The petroleum deposits tend to be located in or near such granular formations when the nature and arrangement of the surrounding formation causes the granular formation to become a structural or stratigraphic trap for petroleum. Most of the fragmental reservoir rocks are siliceous, but many are fragmental carbonate rocks such as oolites, calcarenites, coquinas and the like made up of ooids, calcereous grains of silt and sand size and shell fragments that have been only slightly cemented or recrystallized.

Where the surrounding stratigraphy is such that a subsurface formation may form a structural trap, in many cases the location of the portion which is likely to contain oil can be determined by seismic, gravimetric, or the like exploration data, taken in conjunction with the inferences reached by experimental surface and subsurface geologists. But similar determinations have heretofore been much more difficult in the case of formations likely to form stratigraphic or combination stratigraphic and stratigraphic-structural oil traps. In such cases the formation usually comprises a generally horizontal body which sometimes has an area of less than a few square miles and which tapers toward the edges to have a generally lens-shaped or wedge-shaped thinning out of its thickness. The boundaries between such lenticular formation bodies and the enclosing formations may be either sharp or gradational, but they are usually indistinguishable by the seismic, gravimetric, or the like exploration methods.

Heretofore the determination of the trend of such a subsurface lenticular granular formation has usually required the accumulation of sufficient data to predict the regional strike and/or the shore lines of an extensive body of water such as an ocean, lake or sea that existed during the depositional period. In continental alluvial valleys, the primary sands or granular materials tend to be the most extensive along directions which are generally perpendicular to the regional strike. In the vicinity of a shallow sea, primary sands or granular materials tend to be parallel to the shore lines that existed during the depositional period. In the vicinity of a deep sea such sands tend to be parallel to the trough of the deep sea basin.

In contrast, porous nongranular formations are not formed from deposited sands and other granular materials but are formed from large relatively homogeneous materials or rock. While nongranular formations may not be uniformly porous considerable porosity can exist in these formations as a result of fractures and fissures. In addition the permeability of a nongranular formation may have a preferred direction which indicates the trend of the formation. A porous nongranular formation can contain petroleum deposits in much the same manner as granular formations. Thus, the direction of preferred permeability of a nongranular formation corresponds closely to the trend of the grains forming the granular formations.

Just as the location of petroleum deposits in granular formations may be determined by seismic or other means taken in conjunction with known geological information so may the location of petroleum deposits be located in nongranular formations. Likewise, the determination of the location of petroleum deposits in stratigraphic or combination stratigraphic and stratigraphic-structural oil traps has been difficult in nongranular formations. The trend of such formations that are likely to contain petroleum deposits can be predicted by determining the direction of the preferred permeability of the formation.

In the practice of the invention described in copending patent application, Serial No. 752,592, filed August 1, 1958, now Patent 2,963,641, it is generally assumed, for the case of in situ measurements, that the formations are substantially homogeneous throughout the volume investigated by the measurement apparatus. However, it is known that such homogeneity does not always exist and the present invention is directed to making possible the determination of the direction of trend of formations which do not satisfy this requirement of homogeneity or uniformity.

In measuring properties of a subsurface earth formation by the process of Patent 2,963,641, the earth formation is stressed along lines, each of which extend through the formation in a different direction that is substantially parallel to the bedding planes of the formation. Measurements are made of the amounts of the responses that are produced by stressing a selected length of the formation in the different directions. For example, in a simple embodiment, a cylindrical core sample is rotated around its long axis while it is maintained between an acoustic transmitter and receiver that are located on a line perpendicular to the long axis of the core. Measurements are made of the velocity at which compressional waves are propagated through the core in response to the pressure stresses created by the transmission of acoustic impulses. As the core is rotated, the stresses are applied in different directions, and the magnitudes of the responses are affected by the predominant common alignment of the grains and/or pore spaces within the core. The direction along which a maximum response is exhibited has a known correlation with the pore or grain alignment.

In contrast, in measuring properties of a subsurface earth formation by the process of the present invention, a series of substantially equal portions of the earth formation that are located along a generally circular path paralleling the bedding planes of the formation are each subjected to an equivalently applied stress. Measurements are made of the amount of response exhibited by each of these portions of the formation. For example, in a single embodiment, a cylindrical core sample is rotated around its long axis while its periphery is adjacent to an acoustic transmitter and receiver that are located on a line parallel to the long axis of the core. Measurements are made of the velocity at which compressional waves are propagated along peripheral portions of the core in response to the pressure stresses created by the transmisison of acoustic impulses. As the core is rotated, equal stresses are applied in the same direction to each of the series of peripheral portions of the core, and the magnitudes of the responses are affected by the properties of material contained in those portions of the core. In a homogeneous core in which there is a common direction of orientation of grains and/or pore spaces, the pattern of the responses does not vary with variations in the radial direction of the sampled portion relative to the center of the core. However, if the core is nonuniform and, for example, contains sand along one side of its long axis and shale along the other, the pattern of responses does vary with such variations in radial direction and it is symmetrical about the direction that is perpendicular to the discontinuity in the composition of the core.

In the process of the present invention, it is essential that each stress applied to each portion of the earth formation be equivalent in respect to subjecting each portion to a force that is of the same type, direction, and magnitude, as the force to which the other portions are subjected. This is preferably accomplished by stressing the portions of an earth formation that lie along a closed path that is substantially parallel to the bedding planes of the formation and stressing them by equal amounts along a direction that is substantially perpendicular to the bedding planes of the formation.

A primary object of the present invention is to provide a process for subjecting a portion of a formation to a combination of data-accumulating and data-combining operations that produce an indication of the direction along which the formation was most extensive at the time it was formed.

A further object is to provide a process for obtaining measurement information that is indicative of the trend of a sand formation associated with oil deposits, and is based on samples that can be obtained from a single well which encounters the sand.

Figure 2:
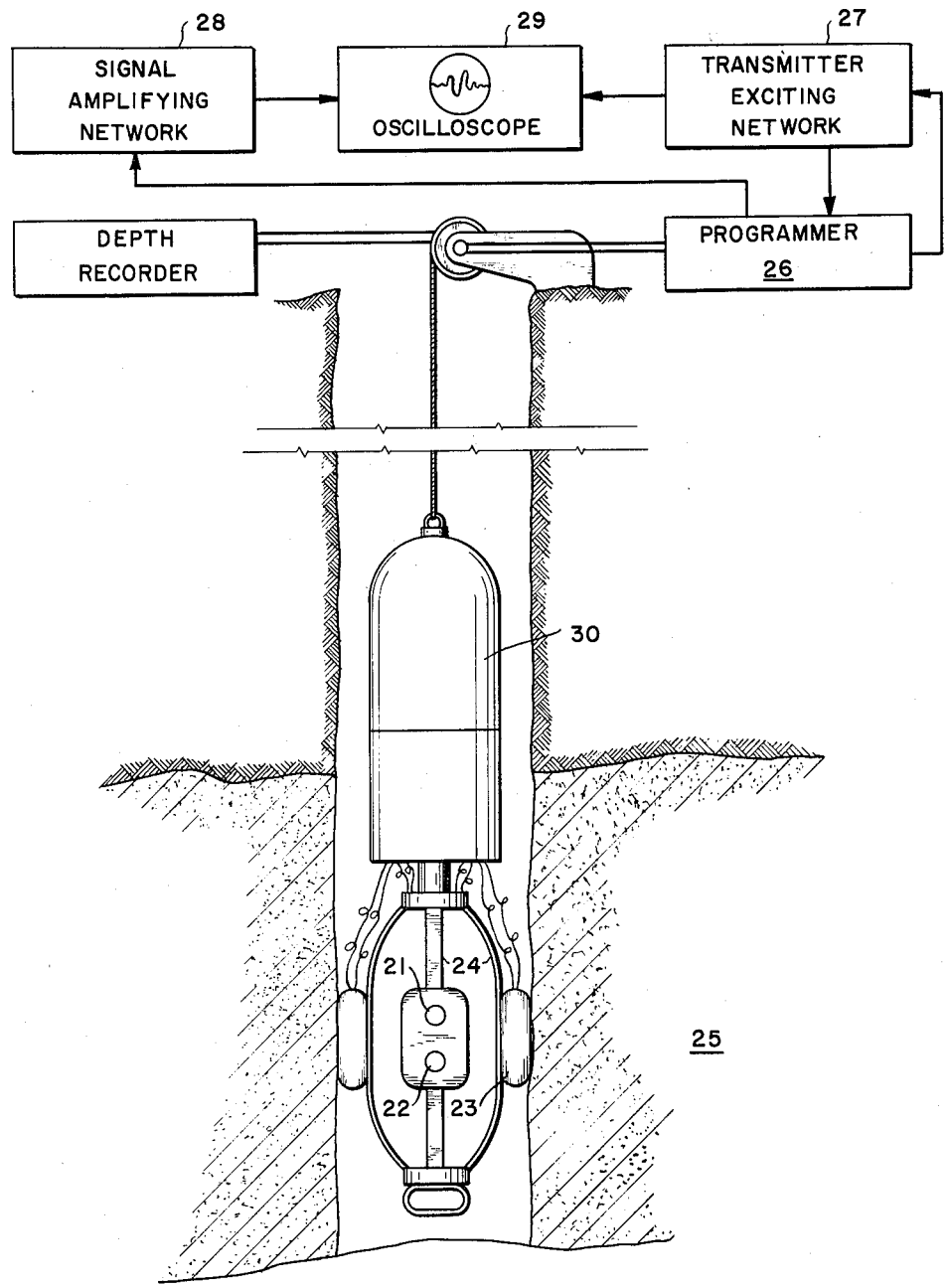
Figure 3:
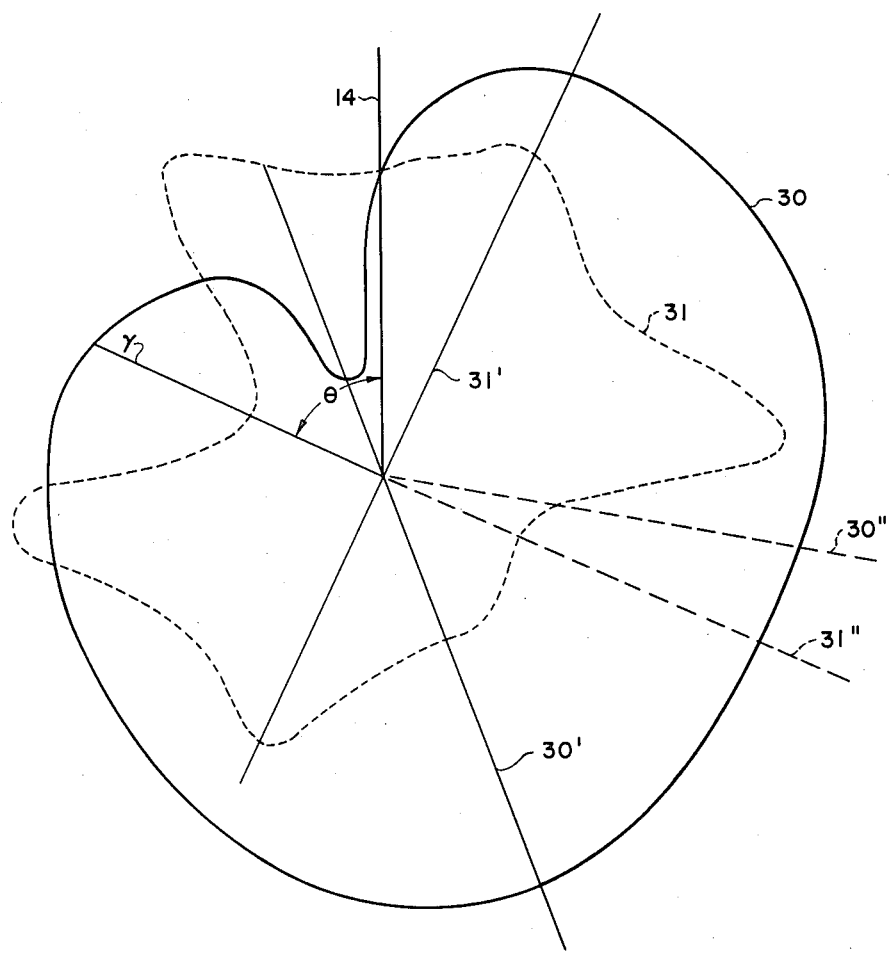

These and other objects of this invention will be understood from the following description taken with reference to the drawing, wherein:

FIGURE 1 illustrates diagrammatically an instrument for determining the direction of a unidirectional gradient of vertical velocity in an earth sample;

FIGURE 2 is a diagrammatic view of a similar acoustical-measuring apparatus adapted to be lowered into a well with associated apparatus being schematically shown as positioned at the surface adjacent the well; and FIGURE 3 is a polar plot of the unidirectional gradient of vertical velocity of a formation in accordance with this invention compared to a polar plot of data obtained by prior art systems.

Although the present invention is not dependent upon any particular theory or mode of operation, it is, at least in part, premised upon the discovery that the lack of homogeneity generally observed in earth formations is in some cases not random, but rather is sometimes characterized by the presence of a systematic gradient of one or more rock properties, for which gradient the component in the bedding plane is substantially unidirectional though nonuniform and generally oscillating in space as to its sign. Furthermore, it is dependent upon the discovery that the direction of such unidirectional gradient component in the bedding plane is indicative of the average direction of sand transport during deposition or preferred direction of permeability in nongranular formations.

The relation between the direction of sand transport and the trend of the sand bed is established by the environment in which the deposition occurs. Therefore, it is possible to determine the trend of a sand formation or the preferred direction of permeability in some cases by selecting a proper sample of the formation and determining the direction of the component of the gradient of a suitable rock property parallel to the bedding planes of the formation. This information is then used to determine the direction of trend of the sand body or the permeability in the manner dictated by the environment in which the formation was formed.

In general, the primary sands that are of the greatest interest to the petroleum industry (and which are the most difficult to map when their outlines are covered by more recent sediments) are composed of grains that were deposited by air or water currents moving over or along topographical structures such as river beds, beaches, submarine bars or deep sea troughs. In the regions within such sand beds in which the positions of the grains most accurately reflect the trend of the sand bed, the bedding planes are substantially horizontal, i.e., have dips of less than about 10 degrees, and the resistivity and vertical velocity sometimes exhibit gradients for which the component in the bedding planes is substantially unidirectional, as explained above.

In its broadest aspects, the present process comprises the following steps:

The method of the present invention may be carried out in the following manner. First, the portions of the formation in which the measurements are to be made should be selected so as to meet the following qualifications. The measurements can be made on a core sample which has been brought to the surface or can be made in situ within the formation. In either event, the portion selected should be a part of the formation having positions relative to each other that they had at the time they were deposition, e.g., a portion in which the dip of the bedding planes was less than about 10°. Where the selected portion is contained in a core which is removed from the formation, the core, or the procedure by which it is removed, should be such that it is possible to determine how the core sample was geographically oriented within the formation.

Second, statistically significant measurements are made of the direction of any unidirectional component of gradient of a rock property which exist in a direction parallel to the bedding planes. These measurements are preferably based upon a rock property which is not directional, but the measurements used may be based upon a directional rock property such as acoustic velocity provided the direction associated with the measurement is held substantially constant during the measurement process, e.g., acoustical velocity being measured in a vertical direction at a plurality of discrete positions around the periphery of the borehole. Such measurements make it possible to determine the geographic direction of any existing unidirectional component of the gradient of a rock property, of a sample whose orientation within the formation is known; such an analysis of the sample shows the geographic direction of the said unidirectional component of gradient parallel to the bedding planes within said formation.

Third, the environments in which the grains were deposited or permeability was formed are determined, and directions that relate to the gradient orientations in a manner dictated by the depositional environments are algebraically added. The depositional environments are determined to be predominantly of the beach, river bed, shallow marine, deep marine, sand dune, alluvial fan, or the like type of depositional environment in which a transporting fluid deposits the grains it is moving in the case of sand formations. The determinations can be effected by means of one or more of the known procedures based on the sorting of the grains, the nature and amounts of microfossils, the chemical composition and properties of the sand components, etc. An algebraic summation is compiled from directions which correspond to the direction of the gradient orientation in manners dictated by the environments in which the grains were deposited, e.g., directions parallel to the direction of the gradient component in the bedding planes for a sand deposited on a beach, and perpendicular to those of gradient components in the bedding planes for a sand deposited in a river bed or on an offshore portion of a sea bottom.

The gradient orientation measurements necessarily correspond to discrete points along the 360 degrees of geographic azimuth through which the line of the gradient orientation extends, e.g., a north-east south-west orientation corresponds to a line extending through 45 and 225 degrees. The above-described algebraic summations amounts to adjusting the measured orientations by adding 90 degrees or 0 degrees; with 0 degrees being added where the depositing current was wide compared to the distance it traveled, such as a wave lapping on a beach, and 90 degrees being added where the depositing current was narrow compared to the distance it traveled, such as a river, a deep sea trough or the like.

In general, the sampling step can be performed by means of the conventional equipment and procedures. Samples are normally obtained from a plurality of wells although considerable information can be obtained from samples taken in a single well. In a preferred practice, substantially the full extent of the formation is cored in a manner providing a substantially intact cylinder which is several inches in diameter. The way in which the core was oriented within the bedding planes is determined by means of an azimuth and/or inclination reference mark placed on the core before it was broken free of the formation, or by measuring the direction of remanent magnetism of the core and correlating it with the earth's magnetic field at the time of deposition, or the like methods. The available portions of the core are studied in respect to the position of the bedding planes and a series of substantially aliquot samples are selected from regions in which the bedding planes of the formation were preferably substantially horizontal when deposited.

The measurements of the directions of unidirectional gradient components in the bedding planes can, although with considerable difficulty, be essentially manually practiced by careful examination of polished surfaces of the cylindrical samples, since these in some cases will exhibit greater degree of continuity of bedding marks in directions perpendicular to that of the unidirectional gradients. However, to avoid the time and effort of visually and manually completing sufficient measurements to obtain values which are statistically representative of the directions of the unidirectional gradient components in the bedding planes, it is highly desirable that the measurements be based upon a property such as the response of the sample to unidirectionally applied stresses at a succession of symmetrically disposed regions around the circumference of the cylindrical sample. A wide variety of systems can suitably be used for supplying and measuring the variations of the effects of unidirectional stresses which are affected by the presence of unidirectional gradient components in the bedding planes.

In a preferred embodiment of the invention, the responses to applied stresses are measured for a succession of symmetrically disposed regions of the cylindrical sample located between a succession of pairs of symmetrically disposed points within the cylindrical sample. These measurements are carried out preferably in a portion of the formation which meets the qualifications described above. The stresses are applied along lines that extend through the formation preferably in a single direction that is substantially perpendicular to the bedding planes. It is of course possible, in some cases, to practice the invention by carrying out measurements in a number of different directions provided this is done in such a way that the variation of direction of applied stress does not affect the measurement being carried out.

Both granular and nongranular formations are bodies in which the masses associated with the various components exist in states of rest or motion dictated by the physical and chemical arrangement of the body. A stress is a force brought about by a physical agent which produces or tends to produce a deformation in a body. In the present process the stress can comprise one or more of a wide variety of electrical, pressure, thermal or the like forces that tend to cause deformations in the portions of the formation body that are encountered in the specified regions.

Measurements are made of the regions in which the stresses are applied and the variations in the ways the formation responds to the stresses. The regions in which there are anomalous responses are then symmetrically disposed about a line parallel to the bedding planes which constitutes an axis of bilateral symmetry and which is parallel to the unidirectional gradient component in the bedding planes.

Numerous kinds of devices and techniques can be used in the stressing and measuring operation. For example, in a capacitance type of electrical system the stresses can be applied by the charge on the plates of a capacitor which is arranged so that the materials along a line that extends, in succession, through a series of portions of the sample comprise the capacitor dielectric, and the measurements can comprise measurements of the capacitances exhibited in the different regions that are so stressed. In a conductance system, the stressing can comprise creating a potential difference along such a line and the measuring can comprise measuring the conductivities exhibited in different regions. In an acoustic form of a pressure system the stressing can comprise generating acoustic impulses at the end of such lines and the measuring can comprise measuring the velocites at which the impulses are propagated or the amounts by which they are attenuated in the different regions. In a thermal system the stressing can comprise creating a temperature gradient along such a line and the measurement can comprise measuring the thermal conductivitiy or diffusivity in the different regions. For ease in describing the present invention, specific reference will be made to only two of the several kinds of such systems that can suitably be used.

When such a stressing and measuring operation is performed in situ within the formation, the regions of stressing can conveniently be located in terms of geographic directions, so that the location of any given region may be given as the geographic direction of a line through the axis of the borehole and perpendicular thereto which extends to the given region and so that the direction of the axis of bilateral symmetry about which are symmetrically disposed the regions giving rise to anomalous responses corresponds directly to the geographic direction of the unidirectional gradient component parallel to the bedding planes with the formation. When such an operation is performed on a cylindrical core of the formation, it is generally preferable to measure separately the geographic orientations the core had within the formation, then measure the direction relative to the core of the axis of bilateral symmetry about which are symmetrically disposed the regions which give rise to anaomalous responses, and, from the two measurements, determine the geographic direction of said axis of bilateral symmetry.

A means for applying and measuring responses to unidirectional stresses in successive symmetrically disposed regions of a core comprises the acoustic system shown in FIGURE 1.

In this system a cylindrical core 11 is rotatably mounted in a housing 12 with a means such as a knob 13 for rotating the core about its axis. A reference mark 14 is placed on the core in order that it may be aligned with a reference mark 10 on the core holder. A series of angularly positioned reference marks 15 are placed on the top of the housing thus providing a means for determining the angular position of the coil for each measurement. A transmitting transducer 16 is disposed on top of the core with a receiving transducer 17 disposed directly below. The two transducers 16 and 17 should be disposed in an aligned relationship in order that the core may be stressed and its response measured in substantially a straight line parallel with the axis of the core. The transmitting transducer 16 is coupled to an exciting network 18 while receiving transducer 17 is coupled to an amplifying network 19. Both networks 18 and 19 are coupled to an oscilloscope 20 which displays the response of the core to the stress created by the transmitting transducer. The oscilloscope display may be recorded by various means, for example by a camera.

In systems operated by rotating a cylindrical core sample 11 between transducers 12 and 13 and displaying on the oscilloscope 14 the electrical signals produced at the moments of transmission and reception will provide measurements of the way the propagation velocity of the acoustic energy varies as the region stressed is successively varied. The oscilloscope, the transducers, and the associated circuitry can of course comprise units of the types that are used in well logging systems, as long as the units are arranged to function in the manner described above. During each measurement, the excitation of the transmitter produces a pressure pulse on one side of the sample thus creating a pressure differential and a resulting physical stress along the line extending through the sample. The rapidity with which such a stress is equalized by the propagation of pressure waves through the sample is one measure of the way in which the sample responds to the stresses.

An analogous acoustic system for applying and measuring acoustically-produced directional stresses to portions of a formation surrounding the borehole of a well is shown in FIGURE 2. In using this system a plurality of pairs of transmitters 21 and receivers 22, normally more than four in number, are mounted in holders 23 which are pressed by springs 24 against the wall of a hole extending through the portion of the formation 25 in which the measurements are to be made. Although four pairs are here shown for the purpose of illustration, normally more than four pairs are used. A surface located programmer 26 sequentially connects each pair to the transmitter-receiver transducers to the exciting network 27 and signal-amplifying network 28 and the oscilloscope 29. The instrument orientation measuring unit 30 measures the geographic direction of the lines extending from the axis of the borehole and perpendicular thereto to the region between the transmitter and receiver of each pair and thus measures the location of the regions in which the acoustic impulses are successively propagated through the formation. In subsurface situations in which there is a unidirectional gradient of velocity in the bedding planes, the regions in which the acoustic impulses propagate at anomalous velocities are symmetrically disposed about an axis of bilateral symmetry, the direction of which is the direction of the unidirectional component of a velocity gradient parallel to the bedding planes in the formation. If desired, a single transmitter and receiver may be rotatably mounted in the borehole to scan the borehole wall in a plane, normal to the borehole.

With respect to the compilation of an algebraic sum of direction that relate to the orientation of unidirectional components of gradients of rock properties parallel to the bedding planes in a manner dictated by the depositional environments, there are, in general, four commonly occurring types of sand formation which, singly, or in combination, are likely to form stratigraphic traps for oil: beach sands, offshore shallow marine sands, deep marine sands, and continental alluvial sands. In the following it can generally be expected that the directions of any unidirectional components of gradients of rock properties parallel to the bedding planes will be perpendicular to the directions in which elongated sand grains are aligned.

The ability of a stream of water to transport solid materials decreases with any drop in the velocity of the stream. As the velocity begins to decrease, the particles tend to settle out, with the deposition of the larger and heavier paricles preceding that of the smaller and lighter particles. It is likely that the heavier end of an elongated and a symmetrical grain is the first portion of the grain to contact or to come to rest as a result of a contact with an immovable substance at the bottom of the stream, and the remainder of the grain swings into an alignment in which it is most nearly streamlined with respect to the current flow.

Beach sands are formed along the shoreline of the sea where the incoming waves refract as they reach the shallower water and the wave fronts become about parallel to the trend of the shore line. The swash of the waves on the beach slope creates currents approximately normal to the beach trend, and the long axis of the grains tend to become aligned parallel to these currents. In the course of time a common type of beach tends to advance further and further into the area occupied by the sea. This seaward accretion of a beach sand is usually, if not always, accompanied by a corresponding accretion of an offshore marine sand which is formed in shallow water at a level slightly below the level at which the beach sand is formed. In a beach sand the bedding planes are generally substantially horizontal, but the direction of common alignment among the grains is substantially perpendicular to the shore line. A beach sand is generally most extensive in the direction followed by the shore line along which the bulk of the grains are substantially simultaneously deposited, and is generally relatively narrow in the direction normal to the shore line along which the beach grows at the very slow rate of the seaward accretion. In such an environment the transporting current is wide in relation to the distance over which it moves the grains.

Offshore marine sands comprise sands deposited on an offshore portion of a sea bottom. They are usually formed of grains transported either by longshore currents that occur in the relatively shallow water near the shore line or by currents that may be termed "density" currents that may have no direct relation to either the depth of the water or the direction of the shore line. The longshore currents often occur at relatively very little distances from the shore line. Even in five feet of water approximately three hundred feet from the shore line and one hundred feet seaward of the small breaking waves, longshore currents have been observed to transport a one-inch thick layer of fine sand in a direction paralleling the shore line. The grains transported by the longshore currents are deposited in horizontal beds and are oriented parallel to the direction in which their sand beds are the most extensive. In this and numerous other environments the transporting current is narrow in relation to the distance over which it moves the grains. The combined action of the lapping waves and the longshore currents often forms relatively long, narrow barrier islands paralleling the shore lines of a sea. At the time of deposition such barrier islands are composed of an upper layer of beach sands containing grains oriented normal to the trend of the island and a lower layer of marine sands containing grains oriented parallel to the trend of the island.

Where the topography of a sea bottom is irregular, underwater currents that transport sand grains tend to move along from the highs to the lows. Such "density or turbidity" currents tend to be guided by gravity down the slopes of submarine canyons to fill in the depressions within the sea bottom. The sand formed by the density or turbidity currents comprise substantially horizontally bedded deposits in which the predominant common orientation of the grains parallels the trend of the deposits.

Many of the continental alluvial sands are formed as a sand-laden stream moves along through the canyons or across the coastal plains on a land mass. The alluvial deposition of sand is generally the greatest on point bars which tend to have a preferred orientation generally paralleling the trend of the river valleys.

The alluvial sands are in part horizontally bedded deposits in which the predominant orientation of the grains is parallel to the trend of the deposit.

Example

The correspondence of measurements which determine the direction of a unidirectional component of a gradient of vertical velocity, said component being parallel to the bedding planes, was tested by comparative measurements. FIG. 3 shows a graphical presentation of data collected by means of the apparatus illustrated in FIGURE 1 and a presentation of data collected by means of dielectric measuring apparatus described in copending patent application, Serial No. 753,177, filed August 1, 1958, now Patent 2,963,642. In FIGURE 3, which is a plot of data in polar coordinates, the radius vectors $\gamma$ for points on the closed curves 30 and 31 are proportional to a function of the travel time through vertically extending regions along the circumferences of two separate cores, which were each about 2 inches thick and which were separated by a depth increment of about 4 inches in the earth.

The positions of points on these closed curves are determined not only by the lengths of corresponding radius vectors, but also by the angle $\theta$, which is the angle measured between the direction of an arbitrary reference line 14 marked on the core (which may be geographically oriented as described above), and lines drawn perpendicular to the core axis and the centers of the vertically extending regions for which vertical velocity is successively measured by the apparatus of FIGURE 1. It is clear that the directions of the axes of symmetry are approximately perpendicular to those of the orientation of elongated sand grains, indicating that the directions of the unidirectional gradient components corresponding to the directions of the axes of symmetry are also perpendicular to the directions of orientation of elongated grains, and thus will be directed either parallel to or perpendicular to the direction or trend of the sand body as controlled by the depositional environment, as discussed above. Thus, the direction of said unidirectional component of a gradient of vertical velocity can be used to provide information as to the direction of trend of a sand body.

It will be seen that there are approximate axes of symmetry 30' and 31' which divide the regions enclosed by the curves into two similarly shaped regions each respectively. Indicated by vectors 30" and 31" are the corresponding directions of orientation of elongated sand grains as determined by the above-referred to dielectric anisotropy apparatus in measurements upon cores from adjacent portions of the sand body, these portions possessing the degree of homogeneity required for measurement by the dielectric apparatus.

In the above example the direction of orientation of the elongated grains as determined by the method of this invention and the method of the above-referenced copending application agree within the limits of accuracy obtainable in this type of work. The results of the two methods illustrated by the axis of symmetry 31' and the direction of orientation 31" agree exactly while the axis of symmetry 30' and direction of orientation 30" are within the limits of accuracy obtainable. This agreement between the results obtained using the two methods indicates that the small diameter cores used were substantially homogeneous. While small cores are usually homogeneous larger samples, as for example the formation surrounding a large diameter borehole, are in some locations substantially non-homogeneous. When a non-homogeneous formation is surveyed using the method of this invention accurate results are obtained, while the method described in the copending application may or may not give accurate results depending on the distribution of the inhomogeneities within the formations.

This invention should not be limited to the particular means described but only to the broad method of geological exploration for determining a direction of a unidirectional gradient component of a formation described herein.

We claim as our invention:

1. A method of geophysical surveying for determining the geographical trend of a formation comprising: obtaining a cylindrical core of known orientation from a formation, the axis of said core being substantially perpendicular to the bedding planes of the formation; mounting said core for rotation about its axis; generating acoustical impulses at a plurality of locations adjacent the cylindrical surface of said core at one end; receiving said impulses at the opposite end of said core and on a line parallel to the longitudinal centerline of the core which passes through the location at which said impulses are generated; recording the magnitudes of said received impulses as said core is rotated and dividing said recording into two halves in which the pattern of the magnitudes of the received impulses of one half is substantially identical with the pattern of the magnitudes of the received impulses of the other half.

2. A method of geophysical surveying for determining the geographical trend of an earth formation comprising:
    applying to the formation a unidirectional stress, said stress being applied in a direction substantially perpendicular to the bedding planes of the formation and at discrete positions around a closed path that is substantially parallel to the bedding planes of said formation;
    detecting the magnitude of the response of the formation to the applied stress near each of said discrete positions to which the stress is applied;
    determining the azimuthal positions of the discrete positions of applying the stress and the magnitudes of the responses at those positions in relation to the center of the closed path; and
    determining the direction of a line that divides the pattern of the magnitudes and azimuthal locations of the responses into equal portions in which the patterns are substantially identical.

3. The method of claim 2 in which the formation is stressed by the propagation of an acoustical impulse and the travel time of the impulse through the formation is detected.

References Cited by the Examiner

UNITED STATES PATENTS 2,963,641  12/1960  Nanz _____ 73—153 X
3,073,406  1/1963   Westphal _____ 181—.53

RICHARD C. QUEISSER, *Primary Examiner.*

J. W. MYRACLE, *Assistant Examiner.*